(12) United States Patent
Wasilewski (10) Patent No.: US 8,387,100 B1
(45) Date of Patent: Feb. 26, 2013

(54) DELIVERY OF APPLICATION FUNCTIONALITY VIA VIDEO-ON-DEMAND ARCHITECTURE

(75) Inventor: Louise M. Wasilewski, Atlanta, GA (US)

(73) Assignee: Cox Communications, Inc., Atlanta, GA (US)

(\*) Notice: Subject to any disclaimer, the term of this patent is extended or adjusted under 35 U.S.C. 154(b) by 69 days.

(21) Appl. No.: 13/080,305

(22) Filed: Apr. 5, 2011

Related U.S. Application Data

(60) Provisional application No. 61/426,026, filed on Dec. 22, 2010.

(51) Int. Cl.
*H04N 5/445* (2011.01)
*H04N 7/173* (2011.01)

(52) U.S. Cl. ............... 725/93; 725/38; 725/87; 725/98; 725/100; 725/102

(58) Field of Classification Search ............ 725/38, 725/87, 93, 98, 100, 102
See application file for complete search history.

(56) References Cited

U.S. PATENT DOCUMENTS 8,024,762 B2\* 9/2011 Britt .............................. 725/92
8,028,322 B2\* 9/2011 Riedl et al. .................... 725/134

\* cited by examiner

*Primary Examiner* — Kieu Oanh T Bui
(74) *Attorney, Agent, or Firm* — Merchant & Gould (57) ABSTRACT

Provision of non video on demand applications and associated content through a video on demand (VoD) infrastructure is provided. An existing VoD application may be used to allow services other than traditional VoD services to be provided to a requesting networked device, such as a cable system set-top box. Applications may be provided by remote application servers acting as VoD servers. Remote content or applications may be requested by a client VoD application, wherein the requested content may be streamed to the requesting device, and a personalized client experience may be provided. The thin VoD client application may interact with the remote application as if the content were VoD content. Accordingly, normal VoD command functionality may be utilized to interact with the remote application.

20 Claims, 4 Drawing Sheets

DELIVERY OF APPLICATION FUNCTIONALITY VIA VIDEO-ON-DEMAND ARCHITECTURE

CROSS REFERENCE TO RELATED APPLICATIONS

The present application claims priority to U.S. Provisional Patent Application No. 61/426,026 filed Dec. 22, 2010, the disclosure of which is hereby incorporated by reference in its entirety.

BACKGROUND

In a cable television/services (CATV) system, service providers oftentimes provide customers with a device (e.g., set-top box) by which the customer may receive digital and analog video programming and digital and analog data, and by which a customer may input data to the CATV system (e.g., interactive television services). A service provider may have millions of devices in the field, wherein some devices may have been deployed for over ten years and may be limited in memory and capability.

As new and more advanced applications become available for providing useful functionality to customers/users, a problem surfaces because older or so-called legacy set-top boxes or other client-side computing devices for providing application functionality and/or content to the end user may not have memory capacity or processing capability for handling the new and more advanced applications. Cable services providers are faced with costly upgrades to or physical replacement of deployed devices, or customers simply do not get the benefit of the new and more advanced software applications. Thus, a need exists for providing new and more advanced software application functionality and associated content via deployed older or legacy devices.

It is with respect to these and other considerations that the present invention has been made.

SUMMARY

The above and other problems are solved by providing application functionality and associated content at a client side cable services system services provision device (e.g., a set-top box) by providing the results of server-based application functionality to the client side via a video-on-demand architecture. According to embodiments, application functionality that is not deployed on a client side device is performed at a server side computing system (e.g., cable services system backend system). Application processing and memory are maintained and utilized at the backend application server, and resulting content produced by processing at the backend server is provided to the customer/user at the client side device via video-on-demand (VoD) architecture. VoD navigation commands, such as Play, Fast-Forward (FF), Rewind (REW), Pause, and the like, may be utilized for interfacing with the remote application functionality and with resulting application functionality content.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to providing application functionality and associated content at a client side cable services system services provision device (e.g., a set-top box) by providing the results of server-based application functionality to the client side via a video-on-demand architecture. Utilization of an existing Video on Demand (VoD) architecture to allow services other than traditional VoD services (e.g., movies, television shows, sporting events, etc.) to be provided to networked devices, such as set-top boxes is provided. Through a combination of backend VoD delivery systems and VoD navigation commands, such as Play, Fast-Forward (FF), Rewind (REW), Pause, and the like (sometimes referred to as "trick mode commands"), application functionality may be housed, maintained and performed at backend application servers and the results of the application functionality may be provided to a customer/user at a client side device via VoD delivery systems. A variety of software applications may be provided by remote application servers acting as VoD servers. Requested content or applications may be requested by a client VoD application, wherein the requested content may be streamed to the requesting device. The thin VoD client side application may interact with the remote application as if the content from the server side application is VoD content. Accordingly, normal VoD command functionality may be utilized to interact with the remote application.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
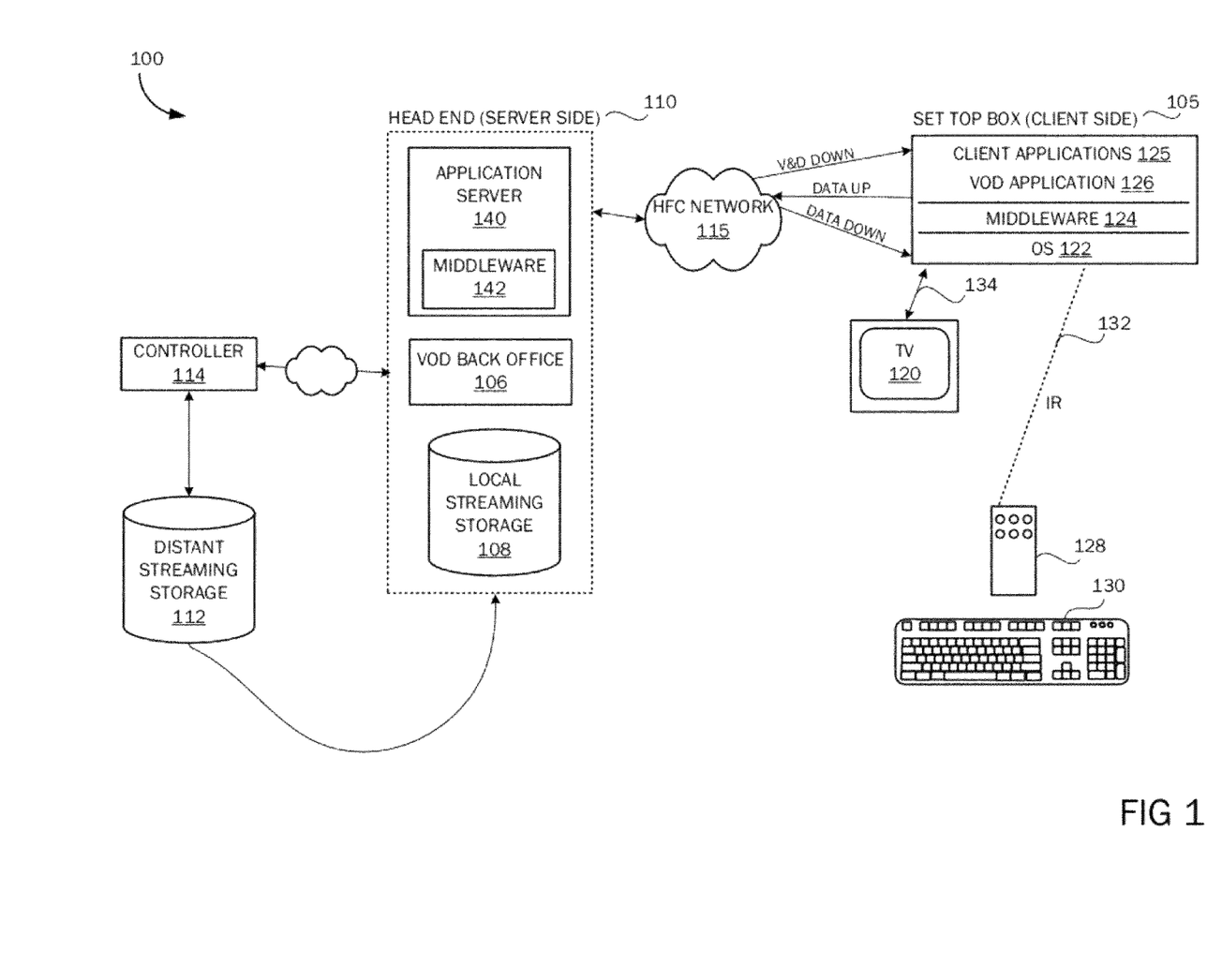
FIG. 1 is a block diagram of a cable television/services (CATV) system with which embodiments of the present invention may be practiced.

A cable television/services system (hereafter referred to as "CATV") architecture 100 showing an integrated video or content on demand architecture that may serve as an exemplary operating environment for embodiments of the invention is described with reference to FIG. 1. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side networked device (e.g. set-top box 105) and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side (backend) head end 110 and a client-side customer via a networked device (e.g., client-side set-top box (STB) 105). As should be appreciated, a STB 105 may be a multipurpose computing device having a computer processor, memory and an input/output mechanism, and connected to a customer receiving device, such as the television set 120. Alternatively, STB functionality may be embedded in a network-connected display device, such as a television 105. According to embodiments, the term "STB" is being used to describe a physical media access control (MAC) address device. This physical MAC address device may be an external STB 105, or may be a television 120 or other network-connected device that comprises a VoD application 126.

As is understood by those skilled in the art, modern CATV systems 100 may provide a variety of services across the HFC network 115 including traditional digital and analog video programming, telephone services, high speed Internet access, video on demand (VoD), and information services. On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As described above, the STB 105 may be a multi-purpose computing device having a computer processor, memory and an input/output mechanism. The input/output mechanism of a STB 105 receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 may also include a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment, the middleware layer 142 of the server-side application server and the middleware layer 124 of the client-side STB 105 format data passed between the client side and server side according to the Extensible Markup Language (XML). As should be appreciated XML is only one example formatting type and other suitable formatting languages or types may be utilized. As also should be appreciated by those skilled in the art, although some embodiments described in this specification are oriented to middleware installed and executed on a STB 105, alternative embodiments implemented as firmware or as hardware are well within the scope of the present invention.

According to one embodiment, the set-top box 105 passes digital and analog video and data signaling to the television 120 via a one-way communication transport 134. According to other embodiments, two-way communication transports may be utilized, for example, via high definition multimedia (HDMI) ports. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via display devices, such as televisions 120. As described above, a number of services may be provided by the CATV system 100, including digital and analog video programming, interactive television services, telephone services, video-on-demand (VoD) services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105.

According to embodiments, VoD services may be provided to clients. When a client requests an asset from a VoD system, a compressed digital stream of bits representing the asset may be transmitted from a video server to a client STB 105, where it may be decoded into analog video and audio, and displayed on a connected display device 120 or by being modulated on an RF channel that links a display device 120 to a STB 105. A video on demand (VoD) back office 106 may be located at the head end 110, and may communicate with a controller function 114. A distant streaming storage 112 may contain additional assets than a local streaming storage 108 may hold. For example, a distant streaming storage 112 may contain movie files. The metadata about the movie files may be published from the controller 114 to the VoD back office 106. A navigation interface may be presented to a client, wherein the client may utilize the navigation interface to select an asset (e.g., a movie title) he/she wishes to view. A session setup request may be sent to the VoD back office 106. The VoD back office 106 may request the local streaming storage 108 to create a stream. Through the metadata, the local streaming storage 108 may know that it doesn't have the asset stored locally, and may send a request through the controller 114 to the distant streaming storage 112 to send the asset to the client 105.

Figure 2:
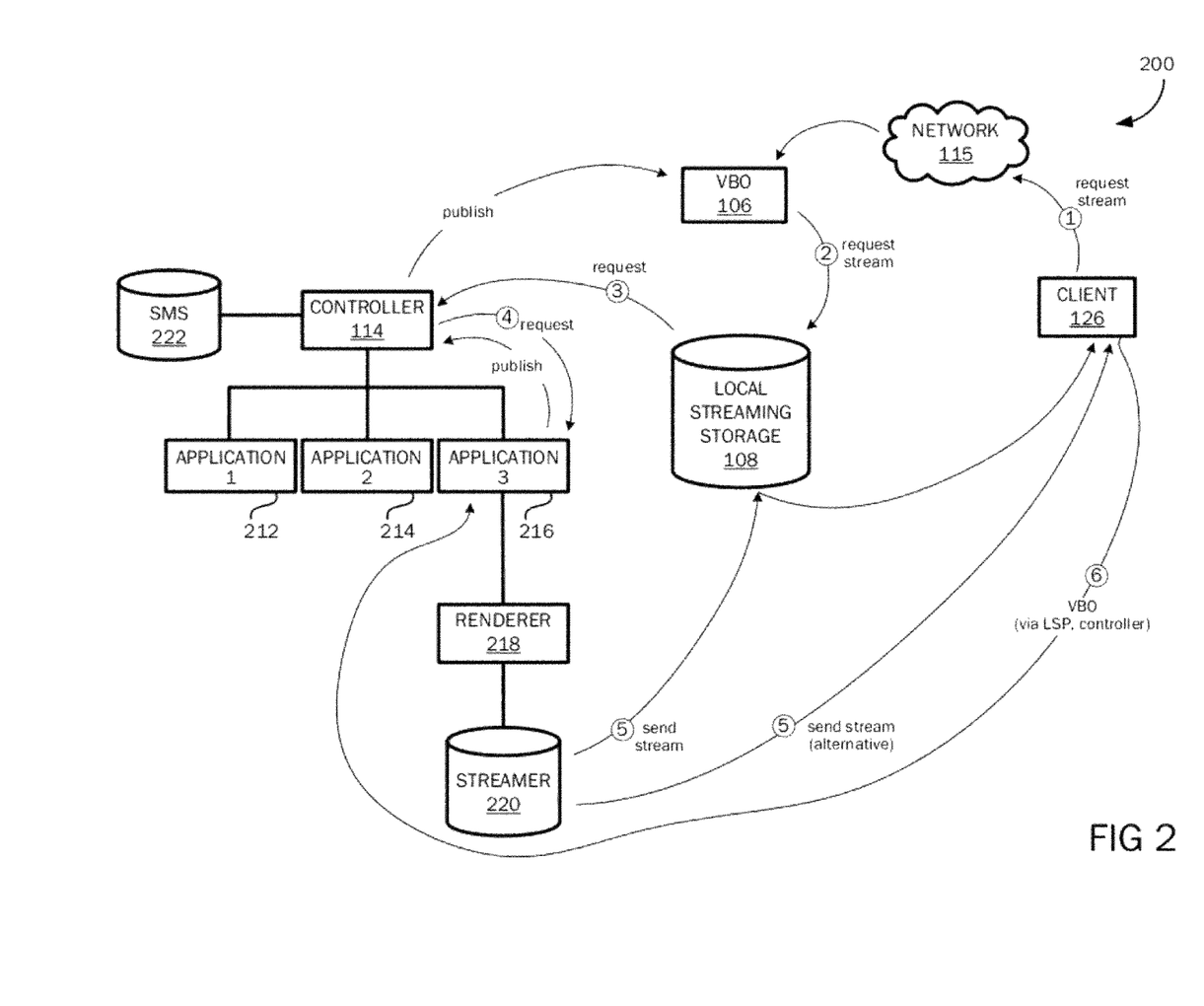
FIG. 2 is a block diagram of a CATV backend system with which embodiments of the present invention may be practiced.

FIG. 2 is a simplified block diagram of a modified video and/or content on demand architecture with which embodiments of the present invention may be implemented. Referring now to FIG. 2, the functionality/content library illustrated in FIG. 1 may be modified to provide services other than VoD to client networked devices. According to embodiments, a VoD application 126 may be accessed by a client. A user interface may be provided whereby the client may access a series of lists that may be navigated. A selectable list of services (e.g., videomail, RSS feeds, horoscopes, etc.) may be provided, as well as details about services (e.g., videomail from a given date, news topics, particular star signs, etc.). Upon selection (e.g., play) of a service, a session setup request may be sent through the HFC network 115 to the VoD back office 106. A play command may be a request sent to obtain an asset from a particular location and to return it to the requesting device (e.g., set-top box) via a unique identifier (e.g., MAC address). The distant streaming storage 112 in FIG. 1 may be replaced by a series of application servers 212, 214, 216 that may render their user interfaces in an applicable format. For example, if a user selects videomail via a play command from a STB 105, the user's personal information may be communicated via the MAC address, and videomails for the user may be shown on a television screen 120. The user may use commands, such as rewind and fast forward, to navigate across selections. According to an embodiment, calls to application servers 212, 214, 216 may be made using a variety of transmission interfaces, for example a second generation (so called C2 interface) for CATV data transmission.

According to embodiments, a user may review an activation sequence in order by navigating through a favorites folder selected from applications in addition to VoD providers. Upon selection, a line item within the application may be selected via a play command. A session request may be sent to the VoD back office 106, which may then be forwarded to a local streaming storage server 108. Upon determining that an asset is coded as reference only, a call may be made to an equivalent controller 114. That is, the local streaming storage 108 may contain metadata, which may allow it to know that the asset is stored remotely. The local streaming storage 108 may send a request through the controller 114. The controller 114, operative to manage data across all application servers, may issue a request for the applicable content. The content may be rendered into a specified format if necessary by a renderer 218, and may be delivered to a streamer 220. The data stream may be sent to the client using a unique identifier of a requesting device (e.g., MAC address of a set-top box). According to embodiments, if the user is presented with a navigation screen, rather than end goal content, the user may use trick mode keys to navigate through the screens. That is, a specified button or command may be used to select an item and generate the next part of the experience. The on demand architecture 200 illustrated in FIG. 2 may include a subscriber database 222. Rights for applications and subscriber entitlements may be stored in the subscriber database 222.

According to embodiments, throughout the application functionality/content via VoD experience, by manipulation of metadata, including a use of updating asset duration, for example through a digital storage media command and control (DSM-CC) extension, the VoD application may see the applications 212, 214, 216 as an "on demand" stream. Accordingly, new applications may be introduced without adhering to limitations of the requesting device (e.g., legacy digital set-top boxes). Applications may be designed to execute in a web domain, and may be presented as video to an on demand infrastructure.

Figure 3:
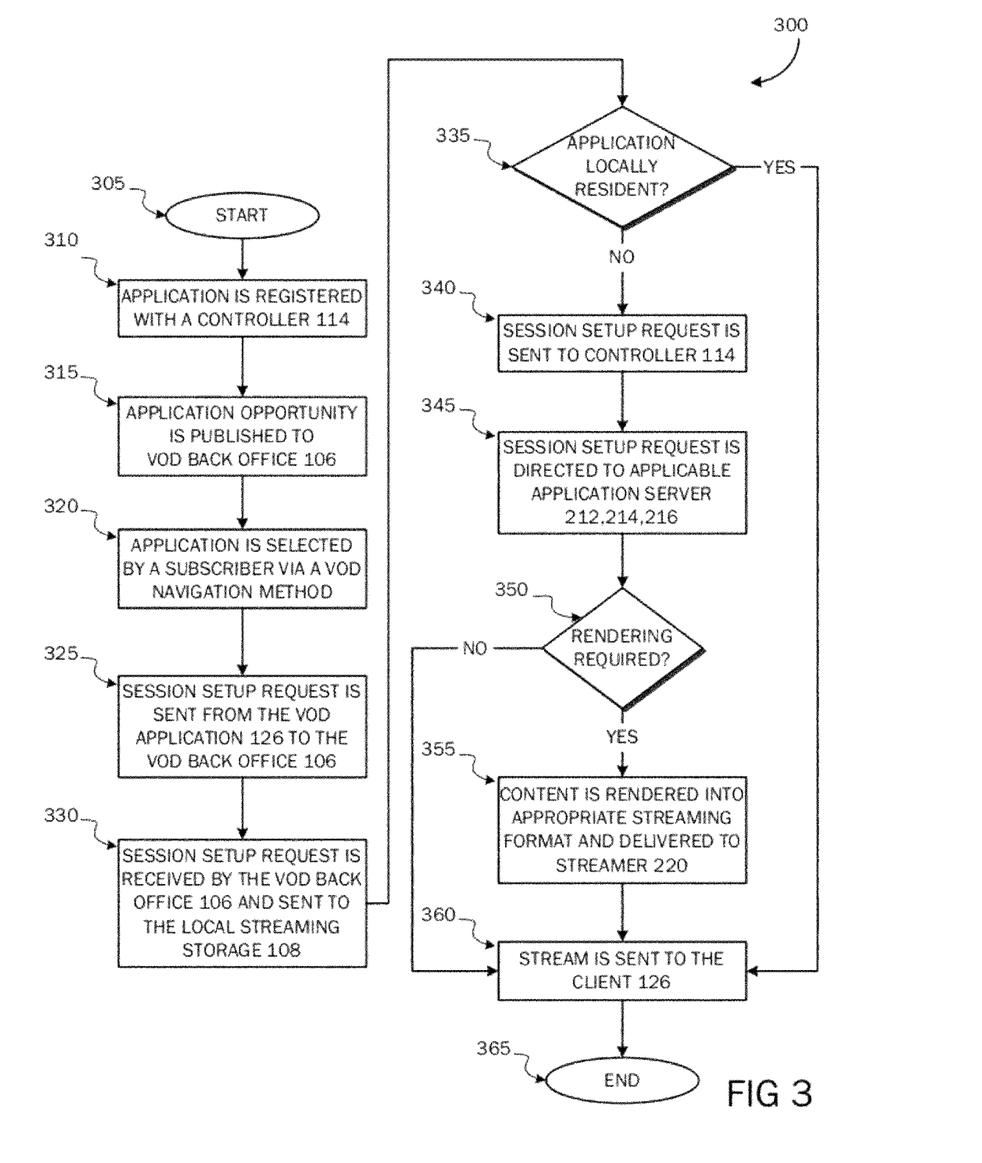
FIG. 3 is a process flow diagram illustrating a method for providing application functionality through a VoD architecture.

FIG. 3 is a process flow diagram of a method for providing services to subscribers through a VoD architecture. The method starts at OPERATION 305, and proceeds to OPERATION 310, where an application's availability and capabilities are registered with a controller 114. An application may be one of various types of applications, for example, but not limited to, videomail, user generated content, videoshopping, horoscopes, games, interactive news feeds, productivity applications, such as word processors, spreadsheet applications, data processing applications, etc.

The method proceeds to OPERATION 315, where a general subscriber experience opportunity is published from the controller 114 to the VoD back office 106. Specifically, the publisher component representing choices to be presented to a subscriber is published. According to embodiments, choices may be presented to subscribers in a personal folder. The personal folder may be personal to a specified subscriber, or may be associated with a given service provider. The personal folder may contain a series of lists that may be navigated. The lists may represent one or more services that may be available to the subscriber via the VoD architecture described herein, for example (but not limited to), videomail, user generated content, videoshopping, horoscopes, games, interactive news feeds, productivity applications, such as word processors, spreadsheet applications, data processing applications, etc. An asset synopsis page may be provided that may point to details about a given service (e.g., videomail from a given date, news topics, particular star signs, etc.). Metadata associated with VoD content may include descriptive data identifying a title of a piece of content, descriptive data to populate a electronic program guide, to provide an index of scenes of a movie, and/or to provide business rules detailing how content may be displayed, copied, or sold. The metadata may contain specific fields that may automatically display information in various areas of a display screen. Embodiments of the present invention provide for replacing one or more metadata fields in an asset synopsis page with other content associated with a non-VoD application. For example, a summary of given movie may be replaced with text stating, "Get Your Video Mail Here."

The method proceeds to OPERATION 320, where an application experience is selected by a subscriber via a normal VoD navigation method. A selection may be made by various means, such as by utilizing a command function (e.g., "play" or "select") on a remote control 128 or keyboard 130. According to an embodiment, a play command is a request sent to obtain an asset from a particular location and to return the asset to the requesting device via a unique identifier, such as a MAC address, wherein the MAC address is a unique identifier for a particular STB 105.

Upon asset selection, the method proceeds to OPERATION 325, where a session set-up request is sent from the VoD application 126 to the VoD back office 106. At OPERATION 330, the session set-up request is received by the VoD back office 106, wherein the VoD back office 106 requests the local streaming storage 108 to provide the requested asset stream.

The method proceeds to DECISION OPERATION 335, where the local streaming storage 108 makes a determination via metadata whether the referenced asset is coded as reference only. That is, it is determined whether the referenced asset is located at the local streaming storage 108, or located remotely, for example, remote applications 212,214,216. If the application is located at the local streaming storage 108, the application may proceed to OPERATION 360.

If the application is not locally resident at the local streaming storage 108, the method proceeds to OPERATION 340, where a request is sent to an equivalent controller 114 to supply the requested asset stream, as determined via the URL of the selected asset. According to an embodiment, the controller may be called via a data call, for example, a C2 data call.

At OPERATION 345, the controller 114 makes a determination of which of the available applications it manages has been requested and directs the request to the applicable application server 212,214,216. According to an embodiment, the controller 114 may communicate with a subscriber database 222 to personalize the experience. The request may include a unique identifier, such as a MAC address, which may be tied to an account in a subscriber database 222. For example, a subscriber's personal video mail may be accessed, and the subscriber's interaction with a requested application 212,214, 216 may provide for a dynamic user experience. According to another embodiment, the unique identifier may be associated with a more general identification, for example, as a specified service provider subscriber.

At DECISION OPERATION 350, a determination is made as to whether the requested content requires rendering. For example, if the requested content is video mail, rendering may not be required as it is already in video format. As another example, if the requested content is not in a video format, then rendering may be required. If the requested content does not require rendering, the method proceeds to OPERATION 360. If the requested content requires rendering, the method proceeds to OPERATION 355, where the content may be rendered into a streaming format (e.g., MPEG2), and then delivered to a streamer 220.

At OPERATION 360, the stream may be sent to the client using the delivered MAC address. If the referenced asset was not located at the local streaming storage 108, the stream may be sent directly from the streamer 220 to the client 126, or alternatively, from the streamer to the client 126 through an edge cache of the local streaming storage 108. If the referenced asset was located at the local streaming storage 108, the stream may be sent from the local streaming storage to the client. The experience may be a personalized experience. In current VoD systems, provided content is static. Embodiments of the present invention provide for user experiences in real time generated through applications 212,214,216 and piped through the VoD back office 106. The user experience may be personalized as the subscriber interacts with the content. For example, if a selected application is a card game, each time a user plays the game, he/she will get a different experience.

Figure 4:
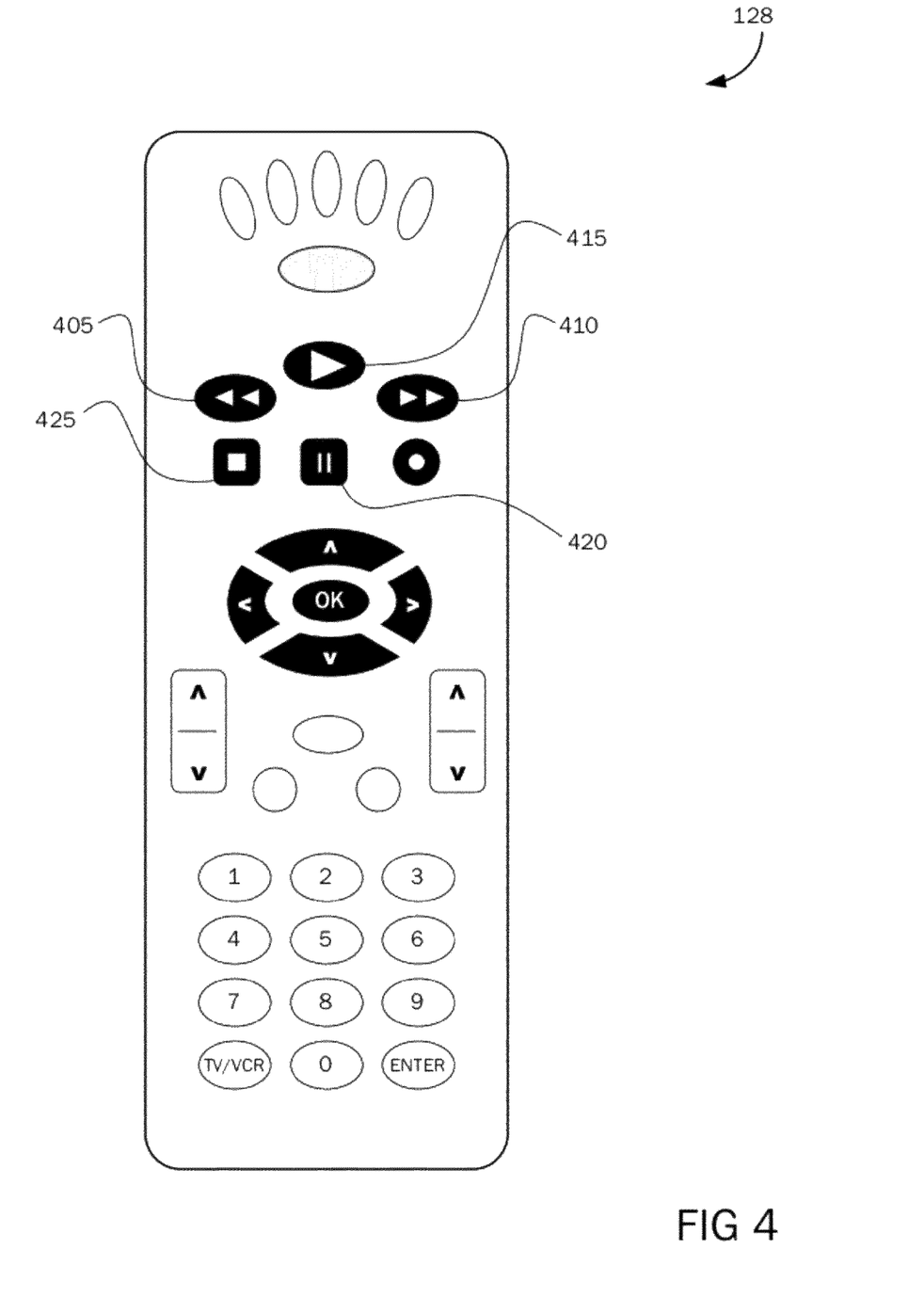
FIG. 4 is an illustration of an example remote control utilized for interacting with non-VoD applications through a VoD architecture.

As shown in FIG. 4, according to embodiments, the subscriber may use VoD navigation keys functions when navigating through selections. That is, buttons or commands typically utilized for VoD may be utilized for non-VoD applications provided through the VoD architecture. For example a Rewind button 405 may be utilized to navigate back; a Fast-Forward button 410 may be utilized to navigate forward; and a Play button 415 may be utilized to select an item, and to generate the next part of the experience. Once a stream is in play, the stream may be paused, accelerated, or reversed, or stopped through the use of the Pause button 420, Fast-Forward button 410, Rewind button 405, or Stop button 425. As should be appreciated use of remote control buttons, as illustrated, in FIG. 4 is only one example of an interface with the VoD-based experience described herein. For example, a set of soft buttons may be displayed on a display screen 120 that may be selected via the remote control device, a keyboard or via other selection means including touch, voice, and the like.

Referring back to FIG. 3, the method ends at OPERATION 365.

By utilizing a thin VoD client 126 at the client side STB 105 and a backend application server acting as a VoD back office 106 to speak to a controller 114, additional application functionality may be provided. New applications may be introduced without adhering to limitations of the requesting device (e.g., legacy digital set-top boxes) or without requiring upgrading of VoD back office 106 technologies. Applications may be designed to execute in a web domain, and may be presented as video to an On Demand infrastructure.

Embodiments of the present invention, for example, are described above with reference to block diagrams and/or operational illustrations of methods, systems, and computer program products according to embodiments of the invention. The functions/acts noted in the operations may occur out of the order as shown in any flowchart. For example, two operations shown in succession may in fact be executed substantially concurrently or the operations may sometimes be executed in the reverse order, depending upon the functionality/acts involved.

While certain embodiments of the invention have been described, other embodiments may exist. Furthermore, although embodiments of the present invention have been described as being associated with data and computer-executable steps or operations stored in memory and other storage mediums, data and computer-executable steps or operations can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing application functionality and associated content the method comprising:
   registering one or more non-VoD applications with a controller;
   publishing the one or more non-VoD applications to a VoD back office computing system through a video on demand (VoD) infrastructure;
   providing a user interface displaying one or more selectable non-VoD applications;
   receiving an indication of a selection of one of the one or more non-VoD applications;
   sending a session setup request for the selected non-VoD application through the VoD back office computing system to a local streaming storage;
   if the selected non-VoD application is coded as not being locally resident at the local streaming storage, sending the session setup request to the controller;
   receiving and directing the session setup request for the selected non-VoD application to an applicable application server;
   if rendering of the selected non-VoD application is required, rendering the selected non-VoD application into an appropriate streaming format; and
   streaming the selected non-VoD application stream to a requesting device.

2. The method of claim 1, wherein directing the session setup request to an applicable application server is determined via the controller.

3. The method of claim 2, wherein directing the session setup request for the selected non-VoD application to an applicable application server includes directing the session setup request to an application server acting as a VoD server.

4. The method of claim 1, wherein providing the user interface displaying one or more selectable non-VoD applications includes providing a personal folder containing a listing of one or more selectable non-VoD applications.

5. The method of claim 4, wherein receiving the indication of the selection of one of the one or more non-VoD applications, includes receiving the indication of the selection of one of the one or more non-VoD applications listed in the personal folder.

6. The method of claim 4, further comprising providing a synopsis page providing information about the one or more selectable non-VoD applications.

7. The method of claim 1, wherein providing the user interface displaying one or more selectable non-VoD applications includes providing a thin VoD client application running on a networked device.

8. The method of claim 7, wherein providing the thin VoD client application running on the networked device includes providing the thin VoD client application running on a set-top box.

9. The method of claim 1, wherein providing the user interface displaying one or more selectable non-VoD applications includes providing a thin VoD client application running on a networked device.

10. The method of claim 9, wherein providing the thin VoD client application running on the networked device includes providing the thin VoD client application running on a set-top box.

11. The method of claim 1, further comprising receiving user input via VoD client controls.

12. The method of claim 11, wherein receiving user input via VoD client controls includes receiving the indication of the selection of a play function to set up the session setup request.

13. The method of claim 11, wherein receiving user input via VoD client controls includes receiving the indication of the selection of one or more of a rewind function, a fast-forward function, a pause function, or a stop function.

14. The method of claim 1, further comprising after rendering the selected non-VoD application into the appropriate streaming format, delivering the selected non-VOD application stream to a streamer.

15. A system for providing non-video on demand applications through a video on demand (VoD) architecture, the system comprising:
   a VoD client application operative:
      to provide a user interface displaying one or more selectable non-VoD applications;
      to receive an indication of a selection of one of the one or more non-VoD applications;
      to send a session setup request for the selected non-VoD application through a VoD back office to a local streaming storage; and
      to receive and display the selected non-VoD application on a display device;
   the VoD back office operative:
      to receive the session setup request for the selected non-VoD application;
      to determine if the selected non-VoD application is locally resident at the local streaming storage,
      if the selected non-VoD application is locally resident at the local streaming storage, to send the session setup request for the selected non-VoD application to the local streaming storage; and
      if the selected non-VoD application is not locally resident at the local streaming storage, to send the session setup request to a controller;
   the controller operative:
      to register one or more non-VoD applications;
      to direct the session setup request for the selected non-VoD application to an applicable application server; and
      to communicate with a subscriber database to receive subscriber data;
   one or more application servers operative:
      to provide one or more non-VoD applications;
      to receive the session setup request for the selected non-VoD application;
      to determine if the selected non-VoD application requires rendering;
      if the selected non-VoD application requires rendering, to render the selected non-VoD application into an appropriate streaming format; and
      to receive and interpret VoD control commands sent from the client VoD application.

16. The system of claim 15, further comprising:
   a streamer operative to:
      receive a rendered non-VoD application; and
      send the rendered non-VoD application to the VoD client application running on a networked client device.

17. A computer readable medium having computer executable instructions which when executed by a computer perform a method for providing non-video on demand applications, the method comprising:

registering one or more non-VoD applications with a controller;

publishing the one or more non-VoD applications to a VoD back office through a video on demand (VoD) infrastructure;

providing a user interface displaying one or more selectable non-VoD applications;

receiving an indication of a selection of one of the one or more non-VoD applications;

sending a session setup request for the selected non-VoD application through the VoD back office to a local streaming storage;

determining if the selected non-VoD application is coded locally resident at the local streaming storage;

if the selected non-VoD application is not locally resident at the local streaming storage, sending the session setup request to the controller;

receiving and directing the session setup request for the selected non-VoD application to an applicable application server;

determining if rendering of the selected non-VoD application is required;

if rendering of the selected non-VoD application is required, rendering the selected non-VoD application into an appropriate streaming format;

delivering the selected non-VoD application stream to a streamer; and streaming the selected non-VoD application stream to a requesting device.

18. The computer readable medium of claim 17, wherein directing the session setup request to the applicable application server is determined via the controller.

19. The computer readable medium of claim 18, wherein directing the session setup request for the selected non-VoD application to the applicable application server includes directing the session setup request to an application server acting as a VoD server.

20. The computer readable medium of claim 17, wherein providing the user interface displaying one or more selectable non-VoD applications includes providing a personal folder containing a listing of one or more selectable non-VoD applications.

* * * * *